United States Patent
Watanabe et al.

(10) Patent No.: US 10,263,275 B2
(45) Date of Patent: Apr. 16, 2019

(54) ALL-SOLID RECHARGEABLE BATTERY, METHOD FOR MANUFACTURING SAME, AND ELECTRONIC APPARATUS

(71) Applicant: FUJITSU LIMITED, Kawasaki-shi, Kanagawa (JP)

(72) Inventors: Satoru Watanabe, Atsugi (JP); Tomochika Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/051,905

(22) Filed: Feb. 24, 2016

(65) Prior Publication Data
US 2016/0172704 A1 Jun. 16, 2016

Related U.S. Application Data

(63) Continuation of application No. PCT/JP2013/072711, filed on Aug. 26, 2013.

(51) Int. Cl.
*H01M 10/00* (2006.01)
*H01M 10/04* (2006.01)
(Continued)

(52) U.S. Cl.
CPC ............ *H01M 10/04* (2013.01); *H01L 51/42* (2013.01); *H01M 2/263* (2013.01); *H01M 4/136* (2013.01); *H01M 4/1397* (2013.01); *H01M 4/382* (2013.01); *H01M 4/5825* (2013.01); *H01M 4/64* (2013.01); *H01M 10/052* (2013.01);
(Continued)

(58) Field of Classification Search
CPC ..... H01M 10/0562; H01M 2300/0068; H01M 4/5825; H01M 10/052; H01M 4/64; H01M 2/263; H01M 10/0525; H01M 10/04; Y02P 70/54; H01L 51/42
See application file for complete search history.

(56) References Cited

U.S. PATENT DOCUMENTS 8,877,388 B1 * 11/2014 Ihlefeld ............ H01M 10/0562
429/304
2007/0292747 A1 * 12/2007 Chiang .................. C01B 25/45
429/52
(Continued)

FOREIGN PATENT DOCUMENTS

JP 05-226002 9/1993
JP 2008-112635 5/2008
(Continued)

OTHER PUBLICATIONS

EESR—The Extended European Search Report of European Patent Application No. 13892637.3 dated Jun. 13, 2016.
(Continued)

*Primary Examiner* — Cynthia H Kelly
*Assistant Examiner* — Monique M Wills
(74) *Attorney, Agent, or Firm* — Fujitsu Patent Center (57) ABSTRACT

The present invention relates to an all-solid rechargeable battery, a method for manufacturing the same, and an electronic apparatus, makes the annealing step for crystallization unnecessary in the all-solid rechargeable battery. The present invention includes a substrate, a negative electrode, a solid electrolyte, and a positive electrode, wherein $LiFePO_4$ in an amorphous state is used as the positive electrode.

3 Claims, 9 Drawing Sheets

(51) Int. Cl.

| | |
|---|---|
| *H01M 10/0562* | (2010.01) |
| *H01M 10/0585* | (2010.01) |
| *H01M 4/58* | (2010.01) |
| *H01M 10/052* | (2010.01) |
| *H01M 4/136* | (2010.01) |
| *H01M 4/1397* | (2010.01) |
| *H01M 4/38* | (2006.01) |
| *H01M 10/42* | (2006.01) |
| *H01L 51/42* | (2006.01) |
| *H01M 2/26* | (2006.01) |
| *H01M 4/64* | (2006.01) |
| *H01M 10/0525* | (2010.01) |
| *H01M 6/40* | (2006.01) |

(52) U.S. Cl.
CPC ... *H01M 10/0525* (2013.01); *H01M 10/0562* (2013.01); *H01M 10/0585* (2013.01); *H01M 10/425* (2013.01); *H01M 6/40* (2013.01); *H01M 2220/20* (2013.01); *H01M 2300/0068* (2013.01); *Y02T 10/7011* (2013.01)

(56) References Cited

U.S. PATENT DOCUMENTS

| | | | |
|---|---|---|---|
| 2011/0117433 A1 | 5/2011 | Sabi et al. | |
| 2011/0236757 A1* | 9/2011 | Yukawa | C23C 14/0036 429/221 |
| 2011/0274974 A1 | 11/2011 | Sabi et al. | |
| 2012/0058385 A1 | 3/2012 | Ito et al. | |
| 2012/0214064 A1 | 8/2012 | Sabi | |
| 2012/0318664 A1 | 12/2012 | Jiang et al. | |
| 2013/0157134 A1* | 6/2013 | Kintaka | C01B 25/37 429/221 |
| 2013/0224632 A1* | 8/2013 | Roumi | H01M 2/166 429/516 |
| 2013/0273405 A1* | 10/2013 | Takahashi | H01M 10/0436 429/127 |
| 2014/0125291 A1 | 5/2014 | Hama et al. | |
| 2014/0370388 A1* | 12/2014 | Singh | H01M 4/136 429/221 |

FOREIGN PATENT DOCUMENTS

| | | |
|---|---|---|
| JP | 2010-205718 | 9/2010 |
| JP | 2011-108532 | 6/2011 |
| JP | 2011-108533 | 6/2011 |
| JP | 2011-222498 | 11/2011 |
| JP | 2012-059497 | 3/2012 |
| JP | 2012-248414 | 12/2012 |
| JP | 2012-256581 | 12/2012 |

OTHER PUBLICATIONS

International Search Report and Written Opinion of the International Searching Authority (Form PCT/ISA/210, Form PCT/ISA/237), mailed in connection with PCT/JP2013/072711 dated Oct. 22, 2013 (9 pages).

CNOA—Office Action issued for corresponding Chinese Patent Application No. 201380079053.0 dated Mar. 20, 2017, with full Machine translation.

EPOA—Office Action issued for corresponding European Patent Application No. 13892637.3 dated Mar. 22, 2017.

G. Dennler et al.,"A self-rechargeable and flexible polymer solar battery", Solar Energy, Pergamon Press. Oxford, GB, vol. 81, No. 8, Jul. 25, 2007 (Jul. 25, 2007), pp. 947-957, XP022169604.

JPOA—Office Action issued for corresponding Japanese Patent Application No. 2015-533793 dated Mar. 21, 2017, with full Machine translation.

CNOA—Chinese Office Action for Chinese Patent Application No. 201380079053.0 dated Sep. 3, 2018, with full translation of the Office Action.

\* cited by examiner

ALL-SOLID RECHARGEABLE BATTERY, METHOD FOR MANUFACTURING SAME, AND ELECTRONIC APPARATUS

CROSS-REFERENCE TO RELATED APPLICATION

This application is a continuation application of International Application Number PCT/JP2013/072711 filed on Aug. 26, 2013 and designated the U.S., the entire contents of which are incorporated herein by reference.

FIELD

The present invention relates to an all-solid rechargeable battery, a method for manufacturing the same, and an electronic apparatus, and in particular, an all-solid rechargeable battery using a positive electrode material for which no crystallization step is necessary, a method for manufacturing the same, and an electronic apparatus.

BACKGROUND

In recent years, lithium ion rechargeable batteries have attracted attention for the application to hybrid vehicles, electric vehicles and the like. In addition, rechargeable batteries are charged with electrical energy that has been generated and supply the charged electrical energy, and thus, there is a large potential for various applications which also has attracted attention.

A typical example of an all-solid rechargeable battery, particularly an all-solid lithium rechargeable battery, where no liquid is used for the electrolyte is a thin film rechargeable battery. Such a thin film rechargeable battery is fabricated by forming films on a substrate such as of silicon in accordance with a vapor deposition method, a PLD (pulse laser ablation) method, a sputtering method, a CVD method and the like, and is characterized in that the film thickness is as thin as several μm.

Such a thin film rechargeable battery is characterized in that the level of safety is high due to the use of a solid electrolyte, and it is possible to integrate it into devices of various sizes. A metal oxide or a metal oxoate(oxyacid salts) is used as the positive electrode of a thin film rechargeable battery. In addition, a metal oxide, a metal oxoate or any of these of which the oxygen that forms these is partially replaced with nitrogen is used as the solid electrolyte. An alkali metal such as lithium or sodium is used as the negative electrode (see Patent Literature 1 or Patent Literature 2).

Figure 12:
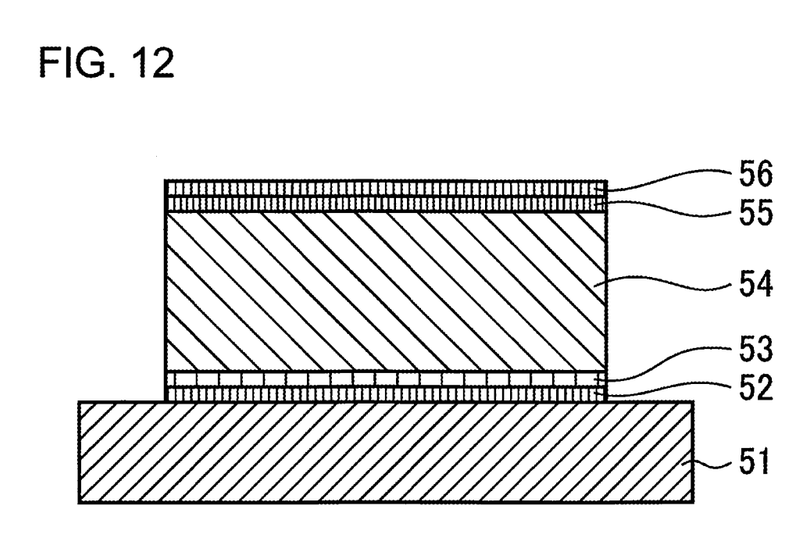
FIG. 12 is a diagram illustrating the structure of a conventional all-solid Li ion battery.

FIG. 12 is a diagram illustrating the structure of a conventional all-solid Li ion battery where films of a current collector 52, a positive electrode 53 and a solid electrolyte 54 are formed on a substrate 51. Next, an annealing treatment is carried out in order to crystalize the positive electrode 53. Then, films of a negative electrode 55 and a current collector 56 are formed. In this case generally, Pt or SUS is used as the current collectors 52 and 56, $LiCoO_2$ is used as the positive electrode 53, LiPON is used as the solid electrolyte 54, and metal Li is used as the negative electrode 55.

CITATION LIST

Patent Literature

Patent Literature 1: Japanese Unexamined Patent Publication 2012-248414

Patent Literature 2: Japanese Unexamined Patent Publication 2012-059497

As for the order of film formation in the conventional thin film rechargeable batteries, only the order of a current collector, a positive electrode active material, a solid electrolyte, a negative electrode active material and a current collector can be applied, which is a large restriction for the circuit design in the case where a thin film rechargeable battery is integrated.

The reason why the opposite order of film formation cannot be applied is that the negative electrode material cannot bear the temperature during the above-described annealing step for crystallizing the positive electrode material. Conventional films of a positive electrode active material and a solid electrolyte are formed in accordance with a PLD method, a sputtering method or a CVD method, and the formed films are in an amorphous state. Here, the amorphous state indicates a state where no diffraction peak can be detected when X-ray diffractometry is carried out. It is considered that these films need to have a crystal structure in order to make it possible for lithium ions to move at the time of charging and discharging. Therefore, heat treatment at 400° C. or higher is necessary for crystallization.

In the case where lithium (of which the melting point is 180° C.) is used as the negative electrode, however, it is possible for the negative electrode to be melted due to its low melting point when heat treatment is carried out on the positive electrode or the solid electrolyte in a state where the film of the negative electrode has already been formed, and thus, there is a risk of internal short-circuiting or other problems.

Therefore, there is such a problem that the annealing step for crystallization bottlenecks the implementation of a tandem structure, even when a tandem structure is desired to increase the output voltage. In the case where an electronic device and an all-solid rechargeable battery are integrated, there is a problem that the circuit design is restricted due to the problematic locations of connections of the positive and negative electrodes.

SUMMARY

One aspect of the disclosed invention provides an all-solid rechargeable battery including a substrate; a negative electrode; a solid electrolyte; and a positive electrode, and the all-solid rechargeable battery is characterized in that $LiFePO_4$ in an amorphous state is used as the positive electrode.

Another aspect of the disclosed invention provides a method for manufacturing an all-solid rechargeable battery that is characterized in that films in a multilayer structure made of a current collector, an $LiFePO_4$ film, a solid electrolyte, a negative electrode and a current collector or made of a current collector, a negative electrode, a solid electrolyte, an $LiFePO_4$ film and a current collector are formed on a substrate at room temperature without carrying out heat treatment during a manufacturing process.

Still another aspect of the disclosed invention provides an electronic apparatus that is characterized by having an all-solid rechargeable battery including a substrate on which an electronic device is mounted; and an all-solid rechargeable battery formed on a surface of the substrate, wherein a positive electrode is made of an $LiFePO_4$ film in an amorphous state.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
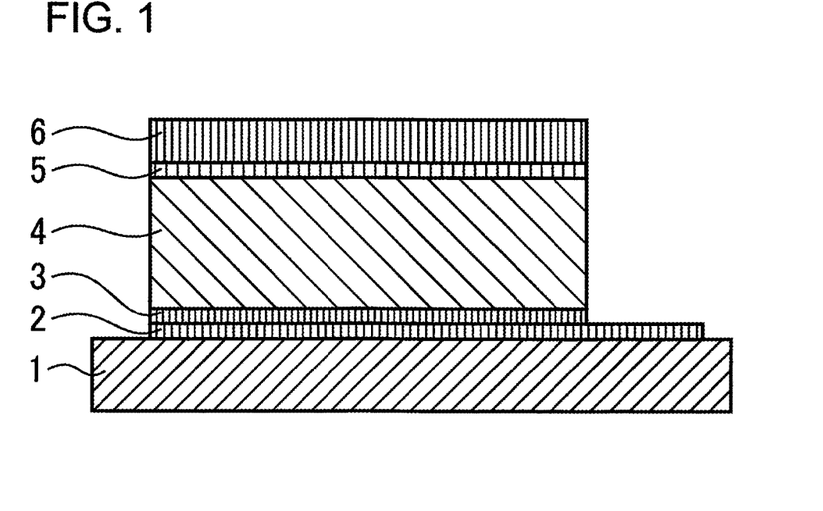
FIG. 1 is a schematic cross-sectional diagram illustrating the all-solid rechargeable battery according to an embodiment of the present invention.

Here, the all-solid rechargeable battery according to an embodiment of the present invention is described in reference to FIGS. 1 through 5. FIG. 1 is a schematic diagram illustrating the all-solid rechargeable battery according to an embodiment of the present invention. Though the description relates to an example where the negative electrode is provided on the substrate side, it may be applied to an example where the positive electrode is provided on the substrate side.

Films of a current collector 2, a negative electrode 3, a solid electrolyte 4, a positive electrode 5 and a current collector 6 are sequentially formed on a substrate 1 at room temperature without carrying out heat treatment during a manufacturing process of the films. Here, an $LiFePO_4$ film is used as the positive electrode without carrying out heat treatment, and therefore, this film stays as an amorphous $LiFePO_4$ film. In order to form films at room temperature in this manner, as illustrated in FIG. 2, an RF sputtering method with a crystal $LiFePO_4$ target is used.

A silicon substrate, a crystal substrate, a glass substrate or an organic substrate such as a polyimide film is used as the substrate 1. Though Pt is typically used as the current collectors 2 and 6, Cu may be used or a Pt film may be provided with a Ti film in between in order to increase the adhesiveness with the substrate 1. LiPON or LAPP (LiAl $(PO_4)(P_2O_7)$) is used as the solid electrolyte 4.

Figure 2:
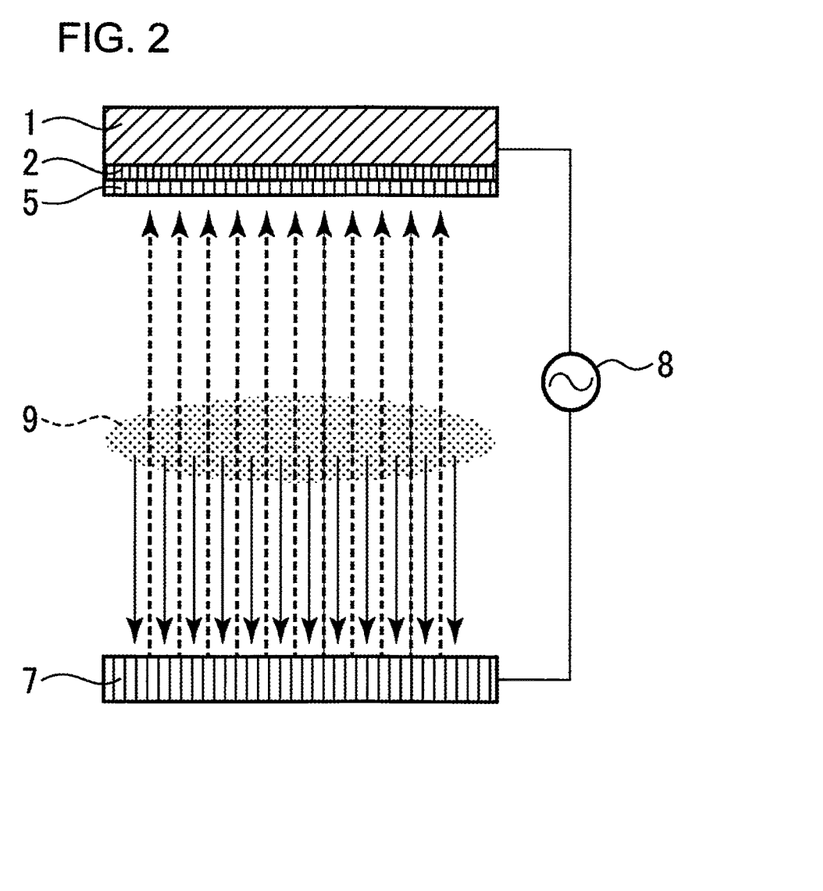
FIG. 2 is a diagram illustrating the method for forming an $LiFePO_4$ film according to an embodiment of the present invention.

FIG. 2 is a diagram illustrating the method for forming an $LiFePO_4$ film according to an embodiment of the present invention. Here, an example where the positive electrode is provided on the substrate side is described for the purpose of making the illustration on the substrate side easier to understand. An RF power supply 8 is connected between the substrate 1 on which a current collector 2 is formed and a crystal $LiFePO_4$ target 7, and Ar ions are generated by means of the RF power so that sputtering is carried out. When the distance between the substrate 1 and the crystal $LiFePO_4$ target is set to 150 mm, the Ar gas pressure is set to 0.1 Pa, and an RF power of 140 W is applied, for example, an amorphous $LiFePO_4$ film 5 is deposited on the current collector 2 at a film formation rate of 0.12 μm/hr.

Figure 3:
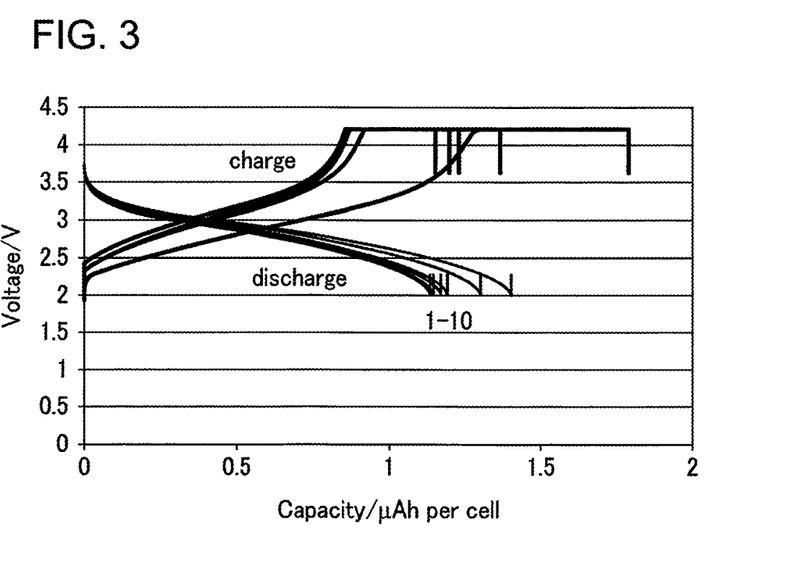
FIG. 3 is a graph illustrating the charging and discharging characteristics of the all-solid rechargeable battery according to an embodiment of the present invention.

FIG. 3 is a graph illustrating the charging and discharging characteristics of the all-solid rechargeable battery according to an embodiment of the present invention, where the charging and discharging operations are carried out ten times. As illustrated in FIG. 3, it was confirmed that the structure having the positive electrode in the upper portion allowed the rechargeable battery to perform properly. Here, the capacity was approximately ½ and the voltage was 70% as compared to the rechargeable battery with the structure having the negative electrode in the upper portion where a crystal $LiFePO_4$ film on which heat treatment was carried out was used as the positive electrode.

Figure 4:
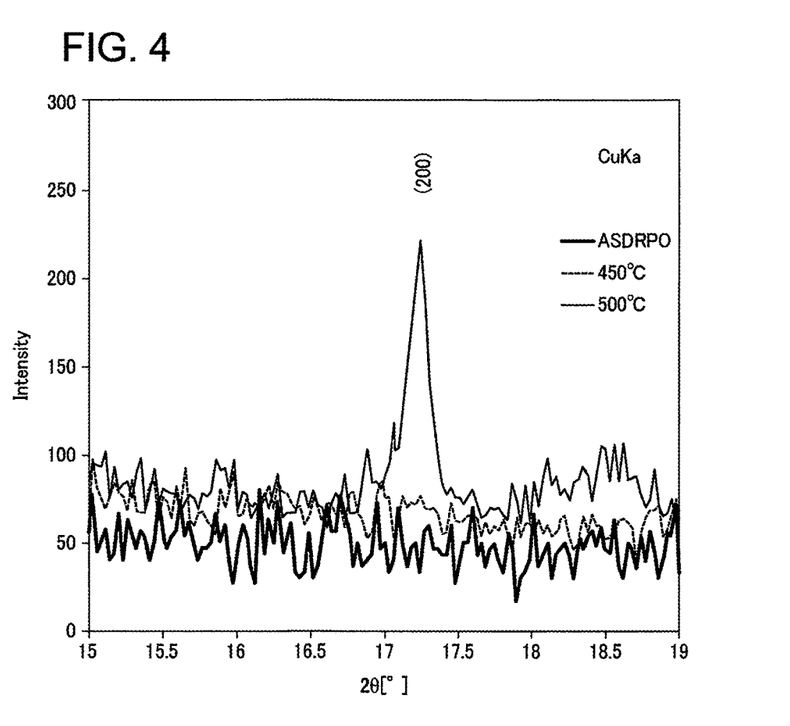
FIG. 4 is a graph illustrating the X-ray diffraction pattern of the amorphous $LiFePO_4$ film used in the all-solid rechargeable battery according to an embodiment of the present invention.

FIG. 4 is a graph illustrating the X-ray diffraction pattern of the amorphous $LiFePO_4$ film used in the all-solid rechargeable battery according to an embodiment of the present invention, which also illustrates examples where heat treatment was carried out for one hour at various temperatures in an Ar gas atmosphere. As illustrated in FIG. 4, a diffraction peak of the (200) plane exhibiting crystallinity appeared as a result of heat treatment at 500° C. or higher. In the case of heat treatment at a temperature lower than that, no diffraction peak of the (200) plane appeared, and thus, it was confirmed that the film was in an amorphous state.

Figure 5:
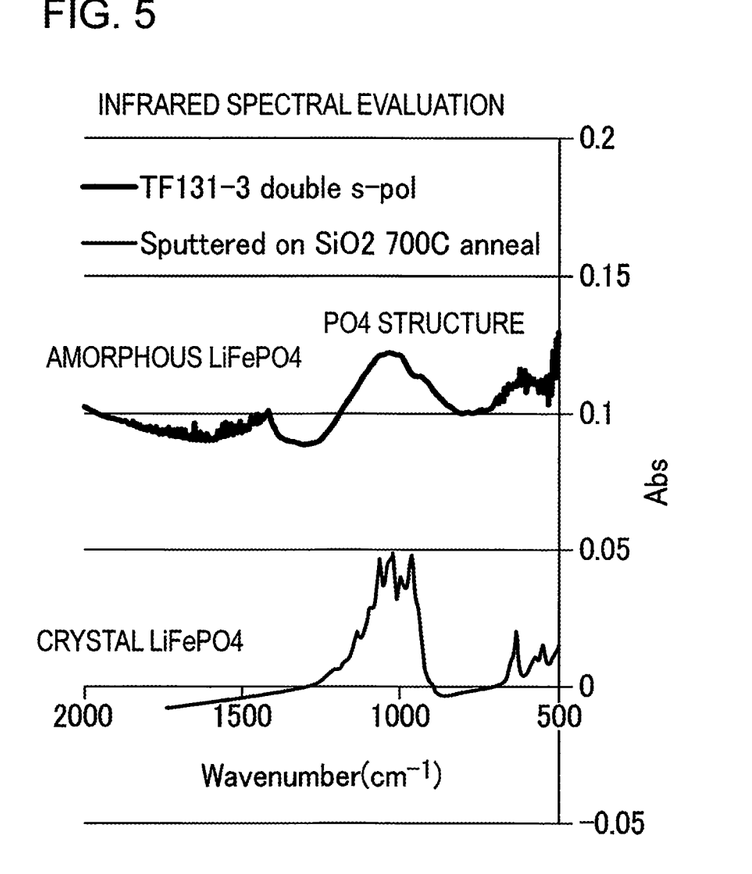
FIG. 5 is a graph illustrating the infrared ray wavelength absorbing characteristics of the amorphous $LiFePO_4$ film used in the all-solid rechargeable battery according to an embodiment of the present invention.

FIG. 5 is a graph illustrating the infrared ray wavelength absorbing characteristics of the amorphous $LiFePO_4$ film used in the all-solid rechargeable battery according to an embodiment of the present invention, which also illustrates the wavelength absorbed by crystal $LiFePO_4$ in the lower portion. Here, the absorption strength is in an arbitrary unit. As illustrated in the graph, acute absorption peaks were confirmed in the case of crystal $LiFePO_4$, while expansion and contraction as well as bending vibrations were observed on the basis of the $PO_4$ structure in the case of amorphous $LiFePO_4$.

According to the prior art, it is considered that the positive electrode needs to have a basket structure in order to make it possible for Li to move at the time of charging and discharging, and therefore, heat treatment for crystallization is indispensable. As a result of diligent research by the present inventor, however, it has been confirmed that a positive electrode made of $LiFePO_4$ has a $PO_4$ structure that is necessary for Li to move even when the used $LiFePO_4$ is in an amorphous state.

As a consequence, the rechargeable battery performs sufficiently even without heat treatment, which makes it unnecessary to take the melting of Li in the negative electrode into consideration. Thus, films can be formed in any order, and the fabrication of a tandem structure becomes possible. In addition, the films can be formed basically at room temperature, and therefore, a wider range of material can be chosen for the substrate. Accordingly, a hybrid rechargeable battery with various types of electronic apparatuses becomes possible.

For example, it is possible to provide an all-solid rechargeable battery through a direct formation of films on a substrate on which an electronic device has been mounted. Here, any type of battery, including a type where the negative electrode is in the top portion, a type where the positive electrode is in the top portion, and a tandem type, can be fabricated, which can reduce the restrictions in designing a circuit.

It is also possible to form films on a substrate such as of a polyimide film so as to provide an all-solid rechargeable battery as a chargeable power supply unit having a structure with a number of p-n junction diodes using an organic semiconductor that can generate a photoelectromotive force and a thermoelectromotive force. In this case, a switching means such as a transistor circuit may be provided so that the p-n junction diodes can be connected in parallel when the structure is used as a photoelectromotive force element, and the p-n junction diodes can be connected in series when the structure is used as a thermoelectromotive force element.

Thus, there is no risk of the negative electrode metal being melted during the manufacture of the all-solid rechargeable battery in accordance with the embodiment of the present invention, and therefore, the order in which films are formed is less restricted, which gives more freedom to the designing of a circuit in which the all-solid rechargeable battery is incorporated. Here, "$LiFePO_4$ in an amorphous state" means there are no (200) diffraction peaks of X-rays, and the full width at half maximum of the isolated peaks observed in a range from 640 $cm^{-1}$ to 660 $cm^{-1}$ in the infrared absorption spectrum is no smaller than 50 $cm^{-1}$.

EXAMPLE 1

Figure 6A:
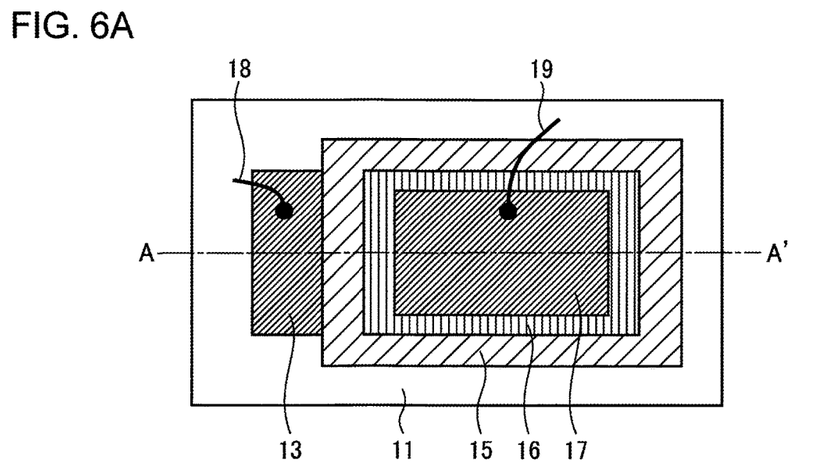
FIGS. 6A and 6B are diagrams illustrating the structure of the all-solid Li ion battery according to Example 1 of the present invention.

Next, the all-solid Li ion battery according to Example 1 of the present invention is described in reference to FIGS. 6A through 7B. FIGS. 6A and 6B are diagrams illustrating the structure of the all-solid Li ion battery according to Example 1 of the present invention. FIG. 6A is a plan diagram, and FIG. 6B is a cross-sectional diagram along the single-dotted chain line A-A' in FIG. 6A.

Figure 6B:
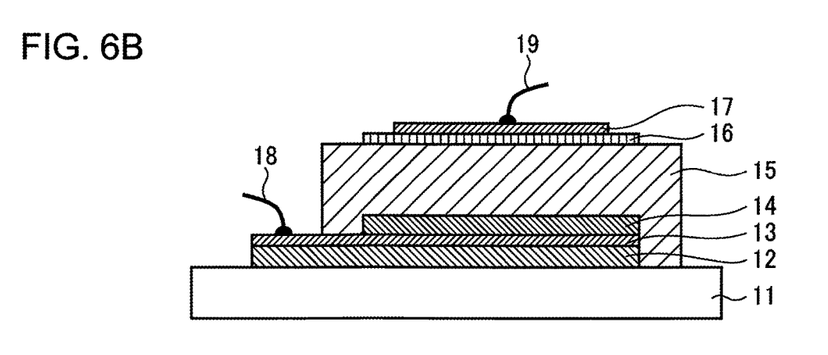

A Ti film 12 having a thickness of 170 nm and a Pt film 13 having a thickness of 30 nm, which becomes the negative current collector, are formed on a silicon substrate 11 at room temperature. Next, an Li film 14 having a thickness of 100 nm is formed, which becomes the negative electrode of which the area is smaller than that of the negative current collector. Next, an LiPON film 15 having a thickness of 1 μm, which becomes a solid electrolyte, is formed so as to cover the entirety of the Li film 14.

Subsequently, an $LiFePO_4$ film 16 of which the area is smaller than that of the LiPON film 15 and having a thickness of 30 nm is formed, and on top of this a Pt film 17 having a thickness of 30 nm is provided, which becomes the positive current collector. Next, a lead-out electrode 18 is provide on the Pt film 13 and a lead-out electrode 19 is provided on the Pt film 17 in order to complete the basic structure of the all-solid Li ion battery. Here, the Li film 14 is formed through vapor deposition, the Ti film 12 and the Pt films 13 and 17 are formed through DC sputtering, and the LiPON film 15 and the $LiFePO_4$ film 16 are formed through RF sputtering.

Figure 7A:
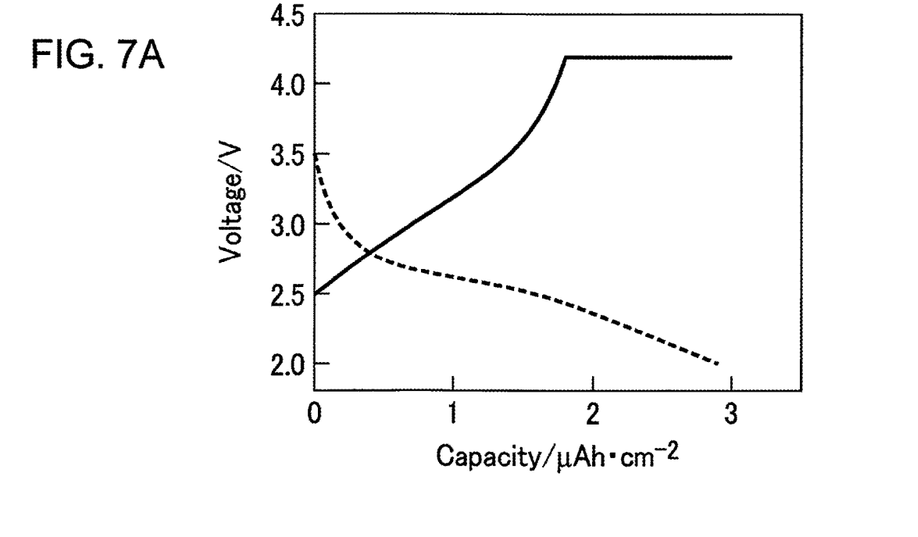
FIGS. 7A and 7B are graphs illustrating the charging and discharging characteristics of the all-solid Li ion battery according to Example 1 of the present invention.
Figure 7B:
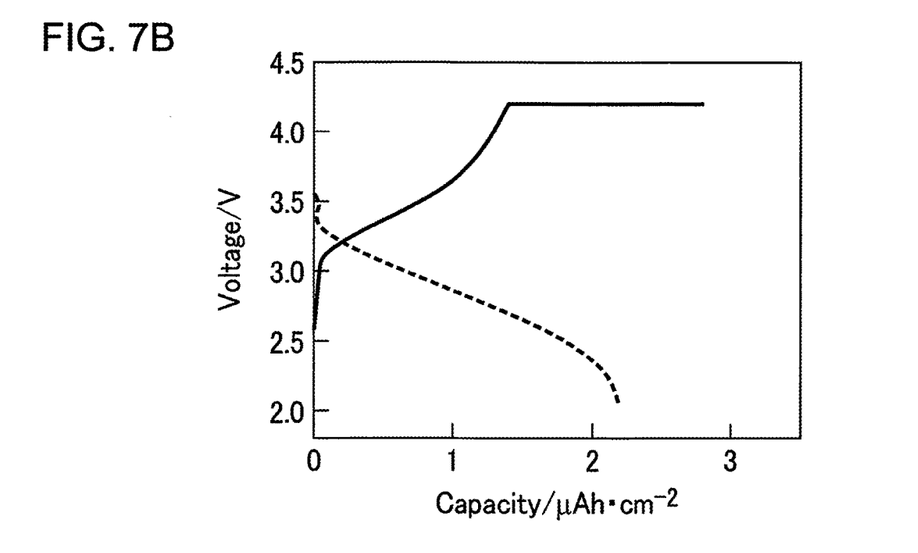

FIGS. 7A and 7B are graphs illustrating the charging and discharging properties of the all-solid Li ion battery according to Example 1 of the present invention. FIG. 7A is a graph illustrating the charging and discharging properties of the all-solid Li ion battery according to Example 1 of the present invention, and FIG. 7B is a graph illustrating the charging and discharging properties of the all-solid Li ion battery on which heat treatment for crystallization has been carried out. As illustrated in FIG. 7A, an $LiFePO_4$ film is used as the positive electrode, and therefore, it can be seen that the rechargeable battery operates even when the $LiFePO_4$ film is in an amorphous state on which no heat treatment has been carried out. The voltage is low as compared to that in FIG. 7B, and the film thickness of $LiFePO_4$ in the sample in FIG. 7A is three times greater than the film thickness of $LiFeO_4$ in the sample in FIG. 7B, and therefore, the capacity is approximately ½, which exhibits sufficient properties for the rechargeable battery to perform.

Thus, $LiFePO_4$ is used as the positive electrode active material in Example 1 of the present invention, and therefore, the rechargeable battery has sufficient performance even when the films are formed at room temperature. As a result, a type of all-solid Li ion battery of which the negative electrode is in the bottom portion can be implemented by placing the negative electrode on the bottom side.

EXAMPLE 2

Figure 8:
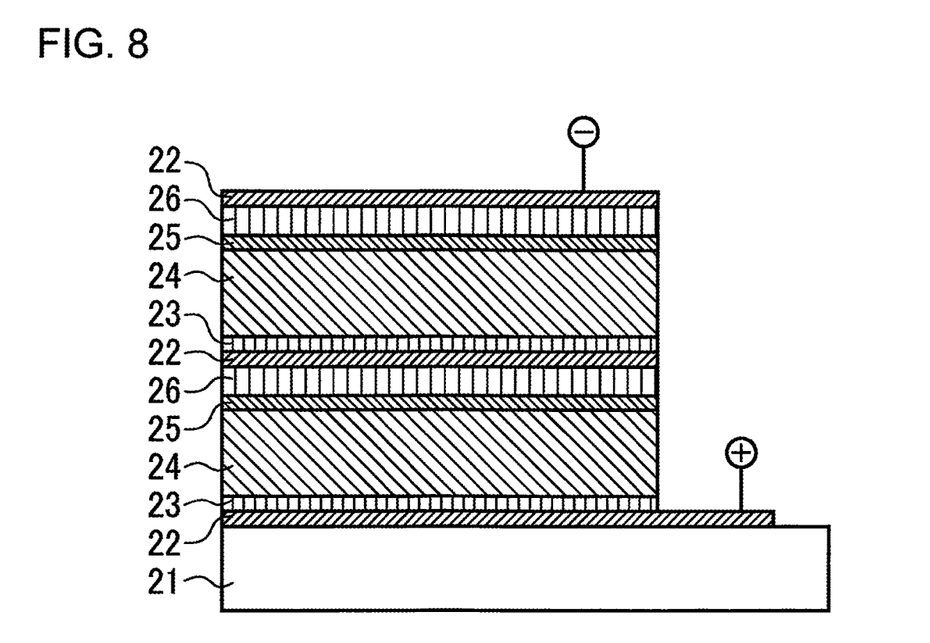
FIG. 8 is a diagram illustrating the structure of the all-solid multilayer Li ion battery according to Example 2 of the present invention.
Figure 9A:
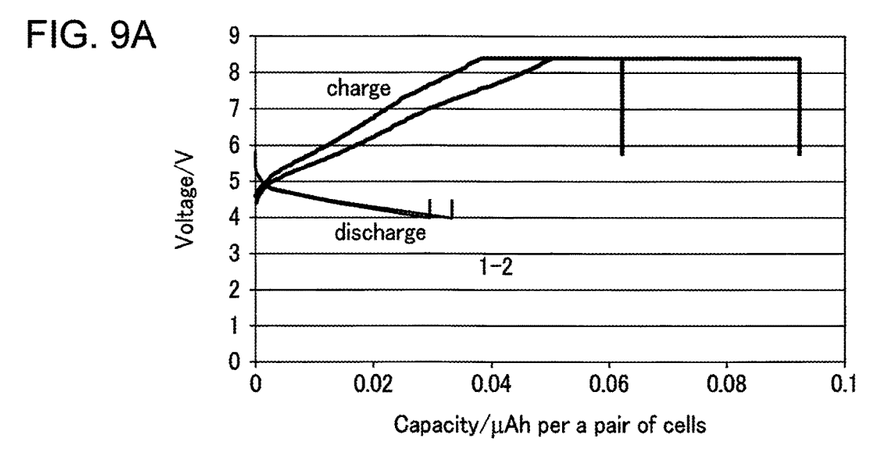
FIGS. 9A and 9B are graphs illustrating the charging and discharging characteristics of the all-solid multilayer Li ion battery according to Example 2 of the present invention.
Figure 9B:
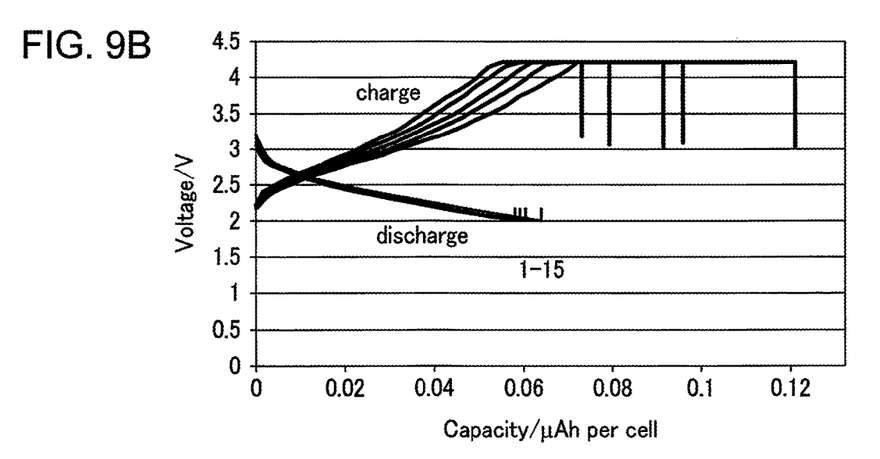

Next, the all-solid multilayer Li ion battery according to Example 2 of the present invention is described in reference to FIGS. 8 through 9B. FIG. 8 is a diagram illustrating the structure of the all-solid multilayer Li ion battery according to Example 2 of the present invention. A Pt film 22 having a thickness of 170 nm is formed on a silicon substrate 21 at room temperature, and on top of that an $LiFePO_4$ film 23 having a thickness of 100 nm is formed. Next, an LAPP film 24 having a thickness of 1 μm, an Li film 25 having a thickness of 100 nm, and a Cu film 26 having a thickness of 0.5 μm, which becomes a current collector, are formed in sequence.

Subsequently, films are formed in the same manner as in the above, starting from the Pt film 22 through the Cu film 26 so as to provide a unit cell structure, and after that, a Pt film 22 having a thickness of 30 nm is formed. Finally, a lead-out electrode is formed on the Pt film 22 at the bottom, and at the same time, a lead-out electrode is formed on the Pt film 22 at the top in order to complete the basic structure of the all-solid multilayer Li ion battery having a tandem structure.

FIGS. 9A and 9B are graphs illustrating the charging and discharging properties of the all-solid multilayer Li ion battery according to Example 2 of the present invention. FIG. 9A is a graph illustrating the charging and discharging properties of the all-solid multilayer Li ion battery according to Example 2 of the present invention, and FIG. 9B is a graph illustrating the charging and discharging properties of a unit rechargeable battery. Here, the all-solid multilayer Li ion battery has carried out the charging and discharging operations twice, and the unit rechargeable battery has carried out the charging and discharging operations 15 times.

As is clear from FIG. 9A, the properties of the rechargeable battery can be confirmed even when a tandem structure is fabricated thanks to a heat treatment process being unnecessary. As is clear from the comparison of FIGS. 9A and 9B, the operational voltage is approximately two times higher than that of the unit rechargeable battery.

Thus, it is possible to implement an all-solid Li rechargeable battery having a tandem structure by using an LiFePO$_4$ film in an amorphous state as a positive electrode in Example 2 of the present invention as well. Though the positive electrode is on the bottom side in FIG. 8, the same properties can be gained in the tandem structure where the negative electrode is on the bottom side.

EXAMPLE 3

Figure 10A:
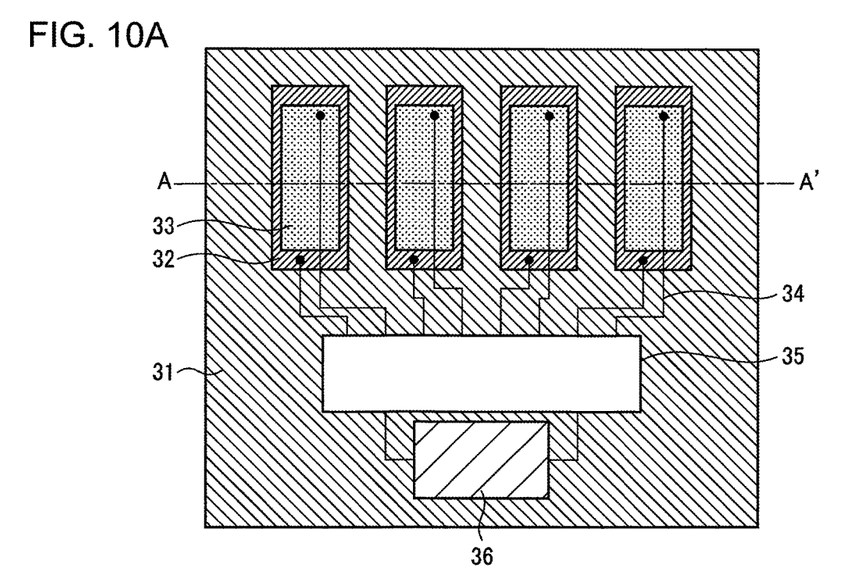
FIGS. 10A and 10B are diagrams illustrating the power supply unit according to Example 3 of the present invention.
Figure 10B:
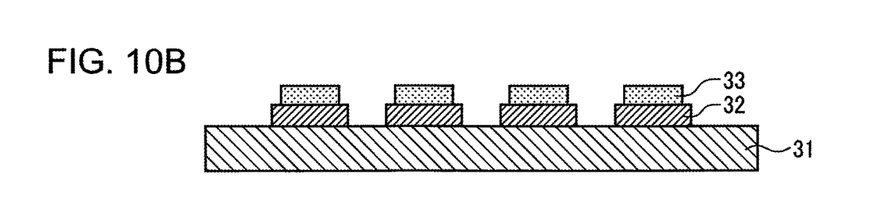

Next, the power supply unit according to Example 3 of the present invention is described in reference to FIGS. 10A and 10B. FIGS. 10A and 10B are diagrams illustrating the power supply unit according to Example 3 of the present invention. FIG. 10A is a plan diagram, and FIG. 10B is a cross-sectional diagram along the single-dotted chain line A-A' in FIG. 10A. As illustrated in the figures, a p type semiconductor 32 made of P$_3$HT (poly-3-hexylthiophene) is formed on a polyimide film 31 in accordance with a screen printing method. Next, on top of this, an n type semiconductor 33 made of PCBM (phenyl-C61-butyric acid methyl ester) is formed so as to provide a p-n junction diode.

Next, the p type semiconductor 32, the n type semiconductor 33 and the switching circuit 35 are connected through wires 34 in order to make switching between the series connection and the parallel connection possible. Though the wires 34 are illustrated as simple lines, they actually have more complicated connection structures. Meanwhile, an all-solid multilayer Li ion battery 36 having a tandem structure according to Example 2 is formed on the polyimide film 31 through film formation at room temperature and connected to the output terminal of the switching circuit 35.

In order to operate this structure with the p-n junction diodes as a photoelectromotive element, the p-n junction diodes are connected in parallel by means of the switching circuit 35. In order to operate the structure as a thermoelectromotive element, the p-n junction diodes are connected in series by means of the switching circuit 35. At this time, one end of each p-n junction diode, for example, the upper terminals in FIG. 10A, is made to make contact with a heat source, and one end on the opposite side, for example, the lower terminals in FIG. 10A, is located on the heat releasing side in order to gain a thermoelectromotive force. The generated photoelectromotive force or thermoelectromotive force charges the all-solid multilayer Li ion battery 36 via the switching circuit 35.

Thus, in Example 3 of the present invention, a power supply unit that can contribute to energy harvesting can be implemented through the integration with a photoelectromotive element or a thermoelectromotive element. This power supply unit is formed on a flexible substrate, and therefore is very effective in realizing a wearable healthcare device.

EXAMPLE 4

Figure 11:
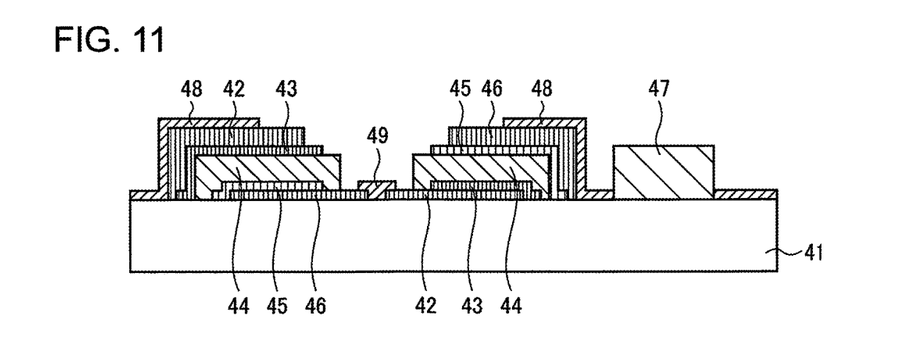
FIG. 11 is a diagram illustrating the structure of the electronic apparatus according to Example 4 of the present invention.

Next, the electronic apparatus according to Example 4 of the present invention is described in reference to FIG. 11. FIG. 11 is a diagram illustrating the structure of the electronic apparatus according to Example 4 of the present invention. As illustrated in the figure, an all-solid Li ion battery is provided through the film formation at room temperature on a silicon substrate on which an electronic device 47 has been mounted. Here, a rechargeable battery of a type where the negative electrode is in the lower portion made of a negative current collector 42, a negative electrode 43, a solid electrolyte 44, an LiFePO$_4$ film 45 and a positive current collector 46, and a rechargeable battery of a type where the positive electrode is in the lower portion made of a positive current collector 46, an LiFePO$_4$ film 45, a solid electrolyte 44, a negative electrode 43 and a negative current collector 42 are formed at the same time.

Here, the rechargeable battery of a type where the negative electrode is in the lower portion and the rechargeable battery of a type where the positive electrode is in the lower portion are connected in series through a Cu connection electrode 49, and at the same time, the positive current collector 46 in the rechargeable battery of a type where the negative electrode is in the lower portion and the electronic device 47 are connected through a Cu wire 48. Here, a vibration sensor is used as the electronic device 47, which may be combined with the photoelectromotive element or the thermoelectromotive element in Example 3, so that a wireless sensor terminal without needing a power supply can be realized.

Thus, LiFePO$_4$ in an amorphous state is used as the positive electrode in Example 4 of the present invention, and therefore, an all-solid rechargeable battery can be formed in any location without depending on the order of the film formation or the substrate material. As a result, the all-solid rechargeable battery is not subject to a restriction in designing a circuit.

The disclosed all-solid rechargeable battery, the method for manufacturing the same and the electronic apparatus make the annealing step for crystallization unnecessary in the all-solid rechargeable battery.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic apparatus, comprising:
   a substrate on which an electronic device is mounted; and
   a first type all-solid rechargeable battery formed on a surface of the substrate,
   where a plurality of unit cells made of a negative electrode made of Li, a solid electrolyte and a LiFePO4 film in an amorphous state are layered on top of each other with a current collector in between,
   wherein the negative electrode made of Li, the solid electrolyte and the LiFePO4 film in the amorphous state are layered in this order,
   the electronic device comprises a plurality of p-n junction diodes using an organic semiconductor configured to generate photoelectromotive force and thermoelectromotive force, and
   the electronic apparatus further comprises a switching circuit configured to switch the p-n junction diodes between a series connection state and a parallel connection state.

2. The electronic apparatus according to claim 1, further comprising:
   a second type all-solid rechargeable battery integrally formed of films of a current collector, an LiFePO$_4$ film in an amorphous state, a solid electrolyte, a negative electrode and a current collector that are layered in this order on the surface, wherein
the first all-solid rechargeable battery and the second all-solid rechargeable battery are electrically connected to each other in series.

3. The electronic apparatus according to claim 1, wherein the solid electrolyte is made of LiPON or $LiAl(PO_4)(P_2O_7)$.

* * * * *